Figure 1:
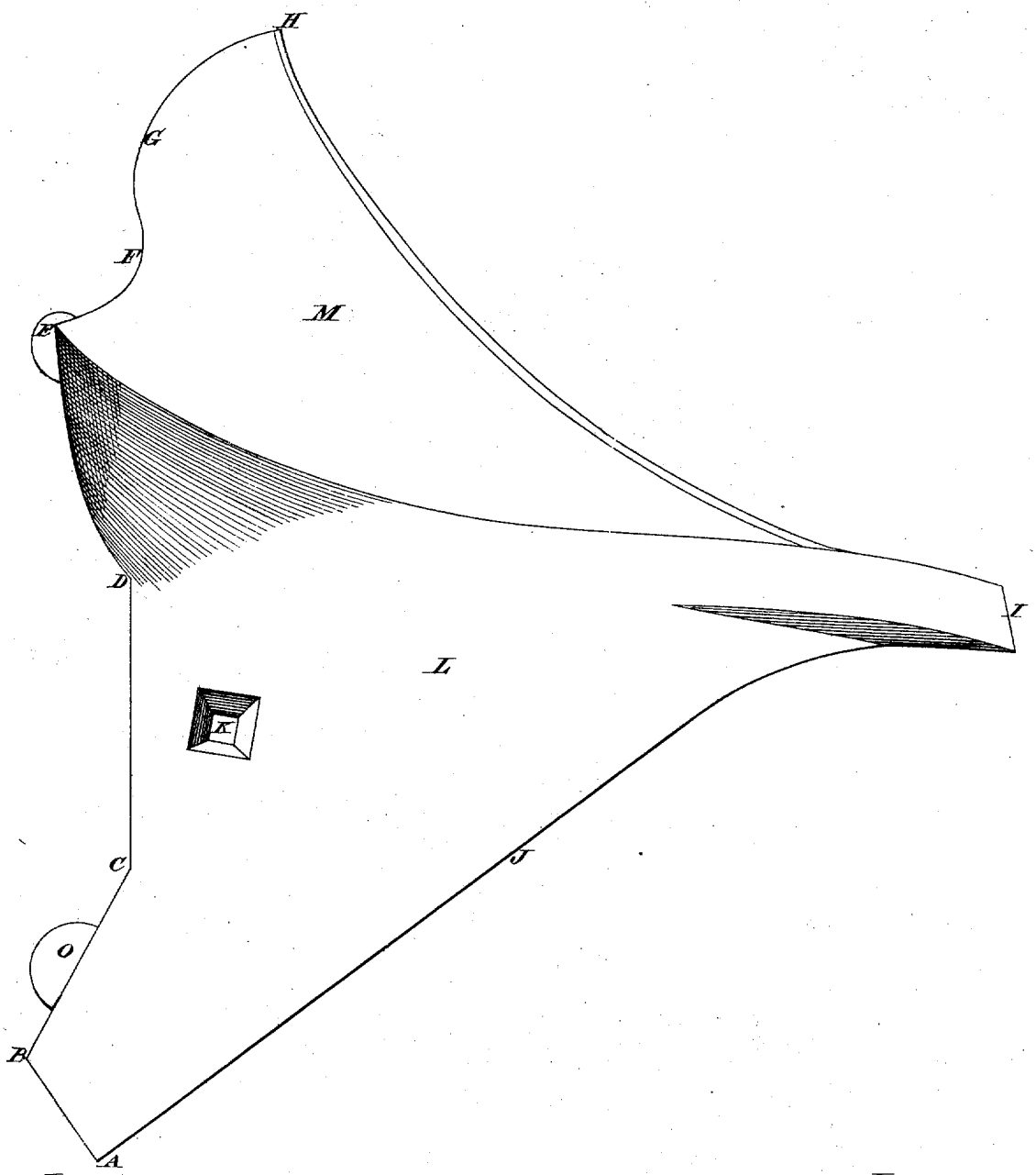

2 Sheets--Sheet 1.

R. H. TAYLOR.

Improvement in Design for Plowshares.

No. 4,866. Reissued April 9, 1872.

Witnesses:

T. C. Brecht

Edw. F. Brown.

Inventor.

Richard Henry Taylor

By Daniel Breed

Atty.

AM. PHOTO-LITHOGRAPHIC CO. N.Y. (OSBORNE'S PROCESS.)

2 Sheets--Sheet 2.
R. H. TAYLOR.
Improvement in Design for Plowshares.
No. 4,866. Reissued April 9, 1872.
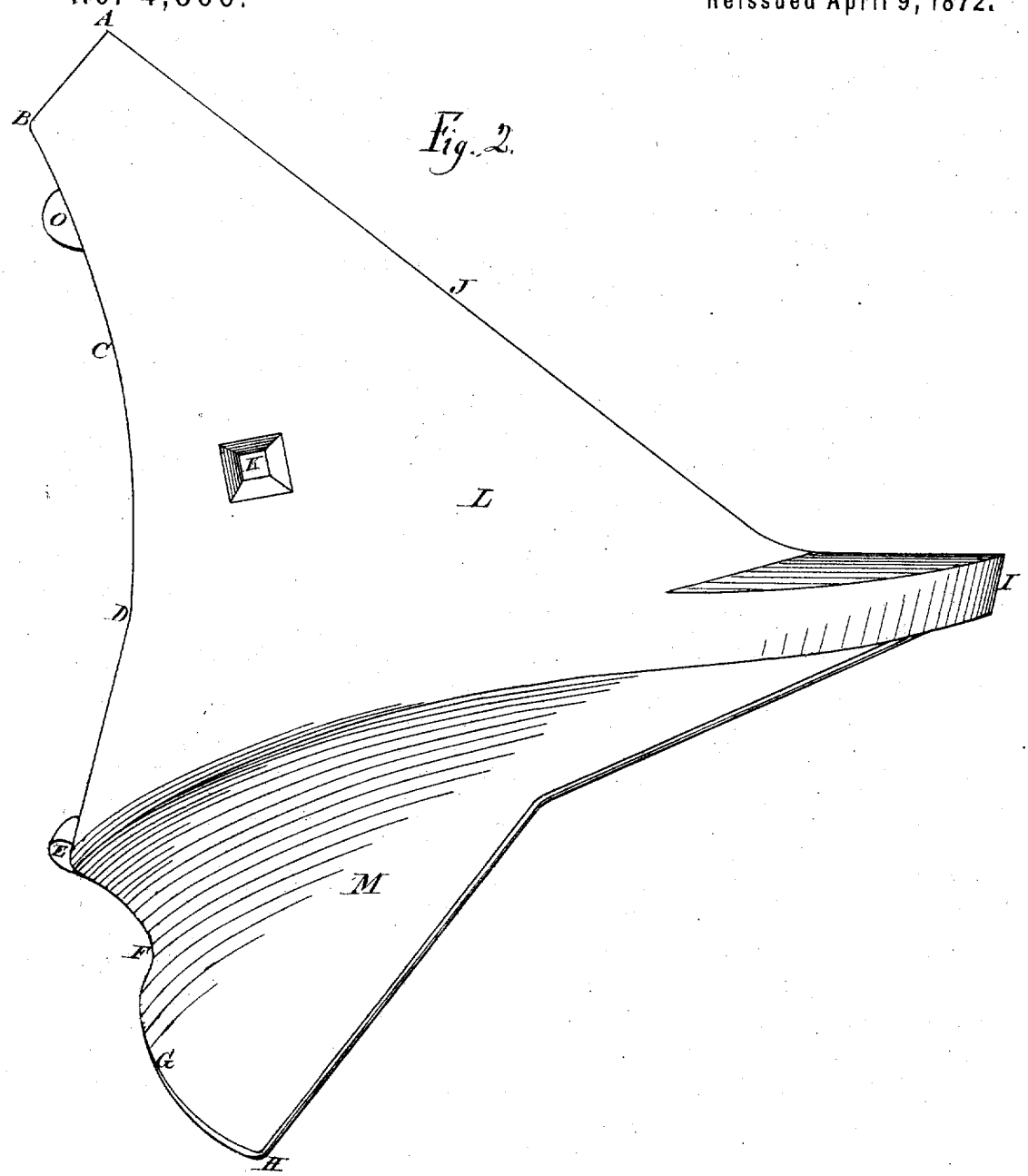
Witnesses:
J. C. Brecht,
Edw. F. Brown,
Inventor:
Richard Henry Taylor
By Daniel Breed
Atty.
AM. PHOTO-LITHOGRAPHIC CO. N.Y. (OSBORNE'S PROCESS.)

UNITED STATES PATENT OFFICE.

RICHARD HENRY TAYLOR, OF LINCOLN, VIRGINIA.

DESIGN FOR PLOWSHARE.

Specification forming part of Design No. 4,521, dated December 13, 1870; reissue No. 4,866, dated April 9, 1872.

SPECIFICATION.

I, RICHARD HENRY TAYLOR, of Lincoln, in the county of Loudoun and State of Virginia, have invented a new and useful Improvement in the Design and Shape of Plow Points and Shares, of which the following is a specification:

My invention consists of a new and peculiar design and shape of plow points and shares.

In the accompanying drawing, Figure 1, Sheet 1, is a perspective view of my improved plow point and share, the same being what is known as a right-hand plowshare. Fig. 2, Sheet 2, is a perspective view of the same improvement adapted to what is known as the left-hand plow.

My plow point and share are more particularly adapted to strong iron plows intended for heavy soils. The point I is made very thick, yet so pitched as to readily enter the soil. The projection or lip E catches under a corresponding lip on the mold-board, and the bolt-hole K is set a considerable distance from the margin C D of the share so as to resist the great strain in plowing on account of the pitch or inclination of the point. A peculiar margin, B C D E, fits a corresponding margin of the mold-board, not here represented. The line A B represents a free edge of the wing, and the line E F G H shows the free edge of the cutter. This cutter M is cast in the same piece with the point I and the share L.

By long experience in the manufacture of plows I have found that plows having the above design work remarkably well in the field. The point has one inch and one-half draft below the land-side, and, therefore, the plow sticks to the ground and is not liable to be thrown out by stones; and the wear of the point by the bottom of the furrow corresponds in direction to the bottom line of the land-side, while it is inclined to the line of the bottom of the point itself, and thus the point will wear longer before becoming too dull to work.

Having thus described my invention, I claim—

1. The above-described design or pattern for right and left hand plowshares, substantially as set forth.

2. The contour or joint B C D E, or the equivalent thereof, for fitting the mold-board of right-hand and also left-hand plows, substantially as set forth.

RICHARD HENRY TAYLOR.

Witnesses:
DANIEL BREED,
EDM. F. BROWN.